United States Patent
Murphree et al.

(10) Patent No.: US 6,256,377 B1
(45) Date of Patent: Jul. 3, 2001

(54) LOOP LOSS MEASUREMENT AND REPORTING MECHANISM FOR DIGITAL DATA SERVICES TELEPHONE CHANNEL EQUIPMENT

(75) Inventors: Stacy Murphree; Jason N. Morgan, both of Madison, AL (US)

(73) Assignee: Adtran, Inc., Huntington, AL (US)

( * ) Notice: Subject to any disclaimer, the term of this patent is extended or adjusted under 35 U.S.C. 154(b) by 0 days.

(21) Appl. No.: 09/318,422

(22) Filed: May 25, 1999

(51) Int. Cl.[7] .............................. H04M 1/24; H04M 3/08; H04M 3/22
(52) U.S. Cl. .................................... 379/24; 379/30; 379/1
(58) Field of Search .............................. 379/1, 6, 12, 21, 379/22, 24, 26, 27–29, 30; 455/423–425

(56) References Cited

U.S. PATENT DOCUMENTS

| | | |
|---|---|---|
| 4,513,179 | 4/1985 | Phillips et al. . |
| 4,864,598 | 9/1989 | Lynch et al. . |
| 4,879,739 | 11/1989 | Forson . |
| 4,937,851 | 6/1990 | Lynch et al. . |
| 5,218,616 | 6/1993 | Stephens . |
| 5,530,367 | 6/1996 | Bottman . |

FOREIGN PATENT DOCUMENTS 36-1010332 * 1/1986 (JP) .

* cited by examiner

Primary Examiner—Duc Nguyen
(74) Attorney, Agent, or Firm—Allen, Dyer, Doppelt, Milbrath & Gilchrist, P.A.

(57) ABSTRACT

A loop loss measurement and reporting mechanism for a digital data services unit obviates interaction with a test unit at a far end of the loop, by relying upon a priori knowledge of the signal power and spectral content of a data port at the far end of the loop to conduct threshold detection and power level measurements. A received signal is amplified by amplifier circuitry, the gain of which is controllably adjusted by the microcontroller based upon the outputs of threshold detectors and power level measurement circuitry that monitor the amplified received signal. A front panel display is controlled by the microcontroller to display loop loss parameter information. To measure and report loop loss, the digital data services unit turns off its transmitter for a prescribed period of time and monitors an in-band signal of known power and spectral content sourced from the far end of the loop. In response to this measurement it iteratively adjusts, as necessary, the amplifier gains, and illuminates the LED display device in accordance with the power measurement.

20 Claims, 2 Drawing Sheets

LOOP LOSS MEASUREMENT AND REPORTING MECHANISM FOR DIGITAL DATA SERVICES TELEPHONE CHANNEL EQUIPMENT

FIELD OF THE INVENTION

The present invention relates in general to communication systems, and is particularly directed to a mechanism for measuring attenuation of a local telecommunications loop (twisted two-wire pair) serving customer premises equipment, and reporting the measured cable plant attenuation at a remote piece of digital data services (DDS) telephone equipment terminating the loop.

BACKGROUND OF THE INVENTION

In the course of turn-up of network access services, it is often necessary to perform one or more test and measurement operations on the local loop (twisted wire pair), such as, but not limited to loop loss (attenuation), the presence of bridge-taps or load coils, and data integrity at different segments of the cable plant. Loop loss is customarily measured by placing a signal transmitter at one termination of the loop and a measurement device at the other (far) end of the loop. The signal generated by the transmitter, which may comprise a tone of known frequency and power, is received by the measurement device to determine the insertion loss across the bandwidth of interest for the service being deployed. The measured loop loss may then be compared with existing cable records or deployment guidelines for the network access equipment.

An obvious drawback to this measurement procedure is the need to employ two pieces of test equipment at the opposite ends of the loop, which may be separated by miles of communication cable. Also, some test equipment is capable of generating only a limited set of tones, which can limit testing capabilities for new services. For a particular service, the network's access equipment may assist in troubleshooting the local loop, as many different types of equipment are capable of estimating loop loss of signal power, which may be reported through a control port.

SUMMARY OF THE INVENTION

In accordance with the present invention, there is provided a loop loss measurement and reporting mechanism that obviates the need to interactively access and/or conduct a test message exchange session with a test unit installed at a far end of the loop. Instead, the invention relies upon a priori knowledge of the operation and signal parameters of a signal-transmitting data port that terminates the far end of the loop, to conduct threshold detection and power level measurements.

At the digital data services (DDS) unit, the loop is terminated in a conventional manner through a transformer to a standard hybrid splitter having respective transmit and receive ports coupled to transmitter and receiver sections of the DDS unit. In order to monitor the loop, the hybrid's receive port is coupled through a controlled gain analog signal amplifier to an analog-to-digital converter (ADC), which digitizes received analog signals for application to a downstream digital signal processor wherein code processing and analysis are conducted. The output of the ADC is coupled to the digital signal processor through a controlled gain digital signal amplifier.

The gains of each of the amplifiers are controlled by the digital data service unit's supervisory microcontroller. The outputs of the amplifiers are monitored by associated threshold detectors, while a power meter is coupled to monitor the power level in the digitized signal output of the digital signal amplifier. A front panel display, such as a light emitting diode (LED) array, which is typically employed for use with digital data services parameters is employed by the unit's microcontroller during a loop loss test mode for displaying loop loss parameter information derived in the course of conducting power level measurements on the receive end of the cable plant.

To measure and report loop loss in the loop loss test mode, the digital data services unit turns off its transmitter for a prescribed period of time, after being powered up, or after a time-out associated with an initial training sequence from a data port at the far end of the loop. During this quiescent loop loss test mode period, the transmitter of the remote data port is active and transmits a continuous in-band signal of known spectral content and power. By in-band is meant a signal lying in a prescribed band of frequencies employed for DDS communications, so that a true measure of loop loss for the DDS operational parameters of the cable plant may be derived. Since the digital data services unit's transmitter is turned-off, there is no potential problem from unpredictable echo power due to bridge-taps or wireline gauge changes. This receive-only condition allows the power level in the monitored signal to be measured and loop loss estimated.

In order to provide an estimate of loop loss through the cable plant, the receive path amplifier gains are initially set to prescribed 'high' gain values associated with a substantial amount of loop loss (e.g., a loop loss of at least 40 dB), and the threshold detector outputs are monitored. If neither detector threshold is exceeded, it is inferred that the cable plant suffers a substantial loop loss, and the monitored power level meter output is sampled and supplied to the test mode microcontroller. The sampled power level is compared with a set of values stored in a look-up table for the loop cable plant of interest, in order to derive an estimate of signal loss through the loop at the Nyquist frequency. The measured loop loss value is then used to selectively illuminate one or more LEDs of the display as a front panel indication of measured (loop loss) power level.

If either of the detector thresholds is exceeded for the first set of (maximum) amplifier gain settings, it is inferred that the loop loss is less than a maximum loss value, and the gain of the associated amplifier is iteratively decreased toward a lower gain value that permits a more accurate power estimate. After one or more adjustments of the gains of the analog and digital amplifiers to gain values that fall within a range associated with the actual loop loss, the measured power level is processed in accordance with associated look-up table parameters, to provide an estimate of loop loss, and the front panel's LED display is controllably illuminated to display the measured power level.

DETAILED DESCRIPTION

Figure 1:
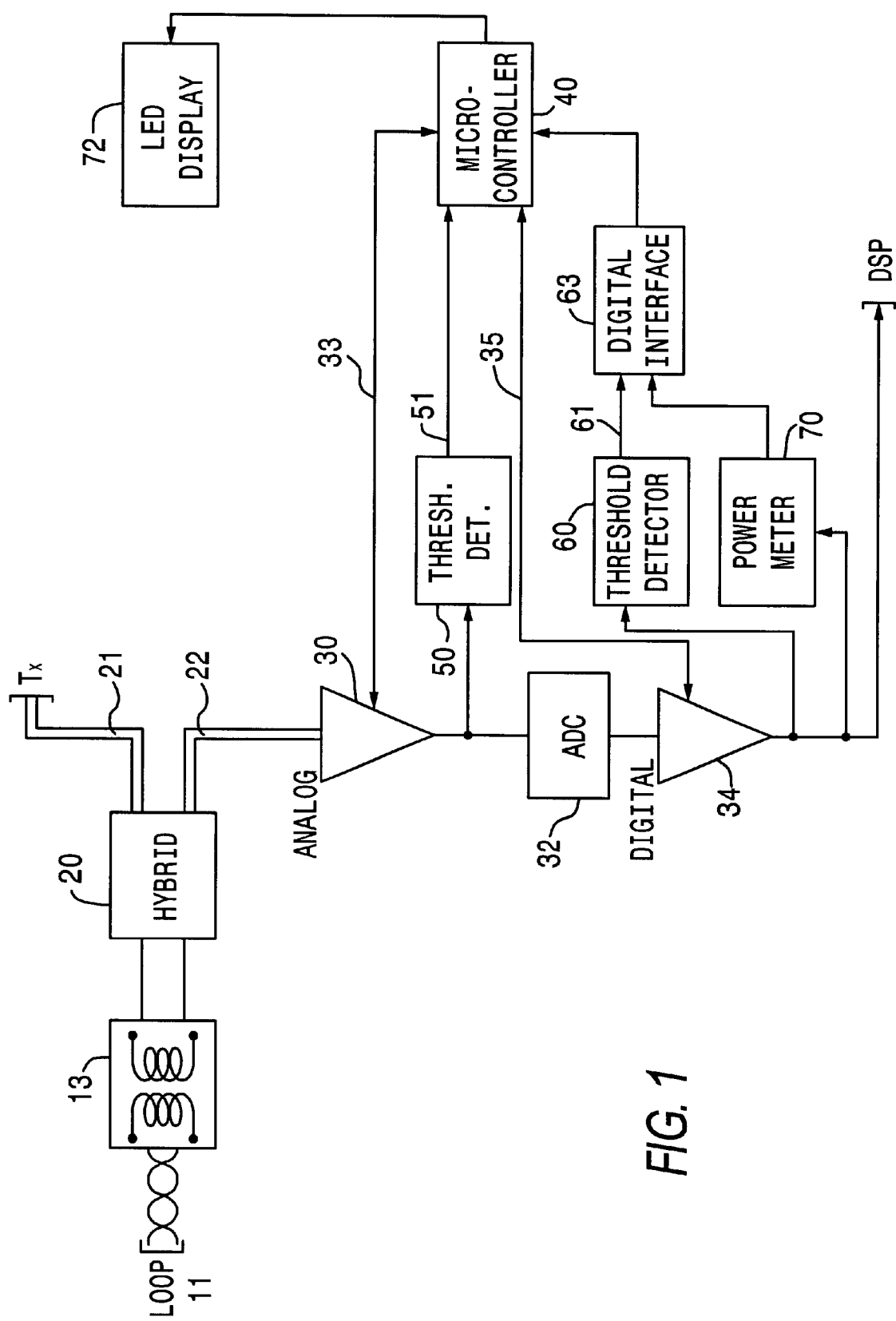
FIG. 1 diagrammatically illustrates loop test circuit components for a digital data services unit to implement the loop loss measurement and reporting mechanism of the invention.

Before describing in detail the new and improved loop loss measurement and reporting mechanism in accordance with the present invention, it should be observed that the invention resides primarily in what is effectively a prescribed communication parameter analysis mechanism that is executable in hardware and software of supervisory communications control components of conventional digital data services communication circuitry, including digital signal processing components and attendant supervisory control circuitry therefor, that controls the operations of such circuits and components.

As a consequence, the configuration of such circuits and components and the manner in which they are interfaced with other communication system equipment have, for the most part, been illustrated in the drawings by readily understandable block and state diagrams, which show only those specific details that are pertinent to the present invention, so as not to obscure the present disclosure with details which will be readily apparent to those skilled in the art having the benefit of the description herein. Thus, the diagrammatic illustrations and associated flow charts are primarily intended to show the major components and functional operations of the invention in the context of a present day digital data services network in a convenient functional grouping, whereby the present invention may be more readily understood.

Advantageously, the present invention may be readily incorporated into a digital data services communication unit of the type described in the U.S. Pat. No. 5,809,033 to M. Turner et al, entitled: "Use of Modified Line Encoding and Low Signal-to-Noise Ratio Based Signal Processing to Extend Range of Digital Data Transmission Over Repeaterless Two-Wire Telephone Link," issued Sep. 15, 1998, assigned to the assignee of the present application and the disclosure of which is incorporated herein. It should be understood, however, that the invention is not limited to use with this or any other particular piece of data communication equipment; this patented scheme has been referenced to provide a non-limiting example of a digital data services communication environment in which the invention may be readily employed.

As pointed out briefly above, the loop loss measurement and reporting mechanism of the present invention is configured to eliminate having to interactively conduct a test message exchange session with another test unit installed at a far end of the loop being tested. Instead, being a self-contained unit within a remote digital data services data unit, the invention relies upon a priori knowledge of the operation of the transmitter of a data port terminating the far end of the loop to conduct loop measurements from the near end of the loop. This self-contained aspect of the invention makes it unnecessary for an outside plant technician to communicate with another individual at a test center or central office, reducing the need for special equipment, which not only makes the technician more efficient, but also reduces the expense of troubleshooting the loop.

Referring now to FIG. 1, the loop test hardware of the invention is diagrammatically illustrated as comprising a set of threshold detection and power level measurement components that are readily implemented using the circuitry of an existing digital data services unit, such as that described in the above-referenced '033 patent. The loop itself, shown at 11, is terminated to the data port by way of a transformer 13, to which respective transmit (Tx) and receive (Rx) signal paths 21 and 22 of the digital data services unit are coupled by way of a hybrid splitter 20.

As the invention is implemented using the receive path 22, and does not require use of the transmit section of the DDS unit, the transmit path 21 is simply shown as a hybrid port termination (Tx signal). The receive path 22 of the receiver section of the DDS unit is coupled through a controlled gain analog amplifier 30 to an analog-to-digital converter (ADC) 32. ADC 32 digitizes received analog signals for application to a downstream digital signal processor (DSP) not shown, wherein conventional code processing and analysis are conducted. For this purpose, the output of the ADC 32 is coupled to the digital signal processor through a controlled gain digital signal amplifier 34.

Via respective control links 33 and 35, the gains of amplifiers 30 and 34 are controlled by an attendant supervisory microcontroller 40. The output of the analog input amplifier 30 is further coupled to a threshold detector 50, the output of which is coupled over link 51 to microcontroller 40. Similarly, the output of digital signal amplifier 34 is further coupled to a threshold detector 60, the output of which is coupled over link 61 to an interface circuit 63, which provides a digital sampling interface to the microcontroller 40 for the threshold detector 60 and a power meter 70 coupled to monitor the output of the amplifier 34. (It should be noted that the outputs of the threshold detector 60 and power meter 70 are associated with the signal amplitude or power level of the digitized signal output of the ADC, not the code value of the quantized output of the ADC, which is coupled to the downstream DSP for signal content analysis and processing.)

The digital data services unit also includes a front panel display, such as a light emitting diode (LED) array 72, that is customarily used to display digital data services parameter information during normal data service (or IN-SYNC) operation. In accordance with the invention, during loop test mode, when no data is being transmitted (NO SYNC), use is made of the LED array to display loop loss parameter information derived in the course of conducting power level measurements on the receive end of the cable plant by the attendant supervisory microcontroller 40.

As a non-limiting example, the front panel LED array 72 may comprise a multi-element (e.g., seven element) linear or column arrangement of LED elements. Such an arrangement readily lends itself to physically simulating a 'power meter' effect. If only a minimum power level is detected (e.g., a loss of at least 56 dB), only the lowermost or bottom LED in the array is illuminated. This indicates a loop loss in excess of a prescribed unacceptable loop loss value (e.g., 56 dB), or an attempt to install the digital services unit beyond the range established in deployment guidelines for the equipment. Each additional LED (above the bottom) may be associated with an additional (0–10 dB) improvement in insertion loss power level, so that as loop loss decreases, more transmit power is received and the output of the LED array tends to climb up the array in the manner of a power meter scale.

Operation

Figure 2:
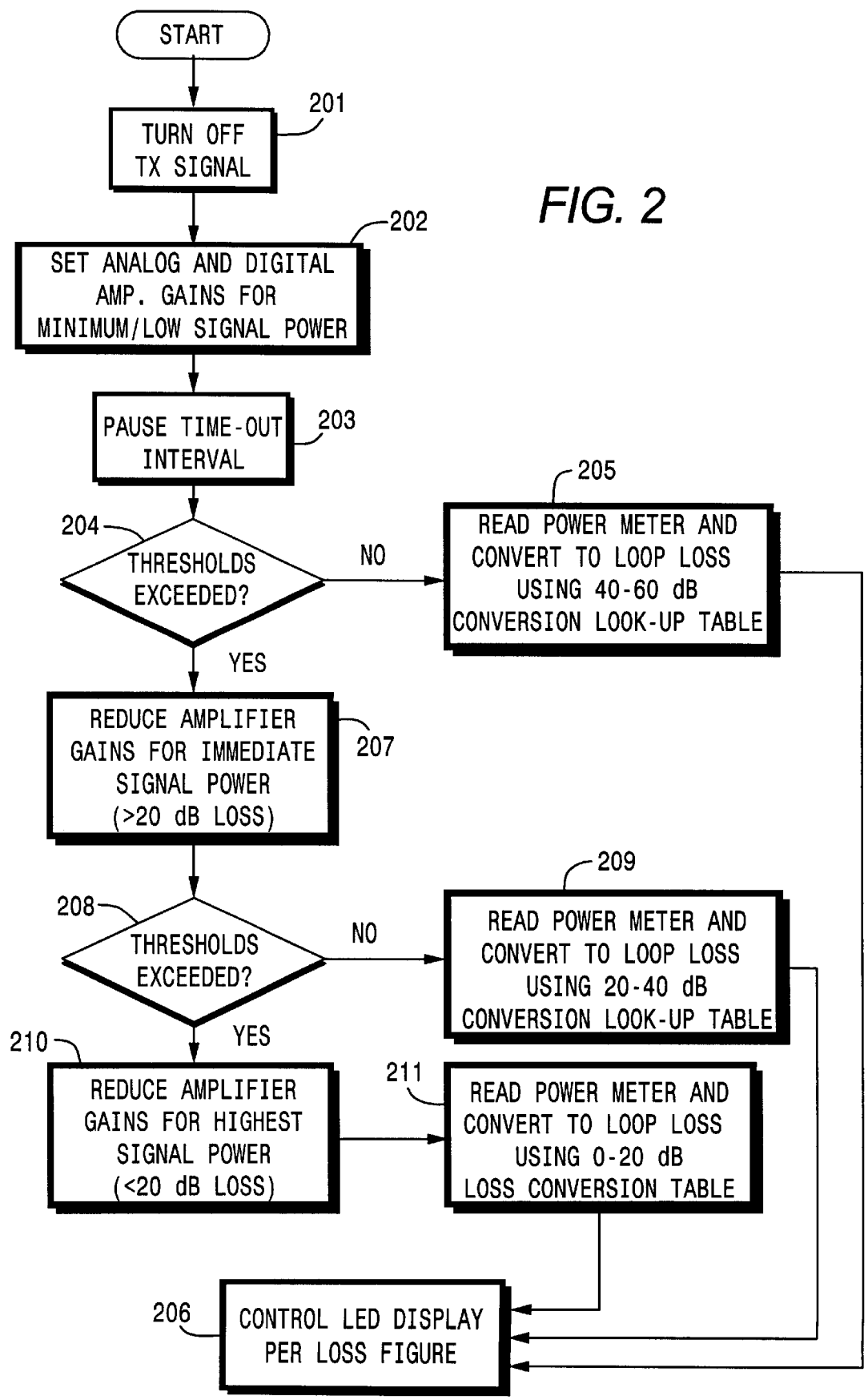
FIG. 2 is a flow chart associated with the operation of the loop loss measurement and reporting arrangement of FIG. 1.

Operation of the loop loss measurement and reporting arrangement of FIG. 1 may be readily understood by reference to the flow chart of FIG. 2. Upon power-up of the digital data services unit, or upon time-out associated with an initial training sequence from a data port at the far end of the loop, the digital data services unit turns off its own transmitter for a prescribed period of time, as shown at step 201. During this quiescent period, the normal operation of the transmitter of the remote data port is to be active and transmitting a signal of known power and spectral content. Since the digital data services unit's transmitter is turned-off, there is no potential problem that may result from unpredictable echo power due to the presence of bridge-taps or wireline gauge changes. This receive only condition of the digital data services unit allows the power level in the signal being continuously transmitted from the data port at the far end of the loop to be measured and loop loss estimated.

For this purpose, at step 202, with its transmitter turned off, the power measurement microcontroller 40 initially sets the respective (analog and digital) gain values of the amplifiers 30 and 34 in the receive path to prescribed relatively 'high' gain values associated with substantial loop loss parameters (e.g., a loop loss of at least 40 dB). After waiting for a prescribed (power level detection) interval (step 203), the outputs of threshold detectors 50 and 60 are monitored in query step 204 in order to derive an estimate of the power in the received signal.

If neither detector threshold is exceeded (the answer to query step 204 is NO), the power level monitored by power meter 70 is read in step 205. This measured power level is then compared with a set of values stored in a look-up table for the loop cable plant of interest, in order to generate an estimate of signal loss through the loop at the Nyquist frequency. For the maximum gain setting, a 40–60 dB loss conversion table may be employed. The measured loop loss value determined in step 205 is then used to selectively illuminate one or more of the LEDs of the display 72 in step 206, and thereby provide a front panel indication of the measured power level.

As noted earlier, if only a minimum power level is detected (e.g., a loss of at least 56 dB), only the lowermost or bottom LED in the array will be illuminated. This indicates a loop loss in excess of a prescribed unacceptable loop loss value (e.g., 56 dB), or an attempt to install the digital services unit beyond the range established in deployment guidelines for the equipment. Each additional LED (above the bottom) is associated with an additional (0–10 dB) improvement in insertion loss power level, so that as loop loss decreases, as described below, more transmitted signal power is received, and the illuminated power indication tends to climb up the array in the manner of a power meter scale.

If the answer to query step 204 is YES (i.e. either of the detector thresholds is exceeded), then it is inferred that the loop loss is less than that associated with the initial maximum amplifier gains (e.g., less than 40 dB in the present example), and the gain of either or both of the amplifiers 30 and 34 are adjusted (decreased) toward values that permit a more accurate power estimate. In particular, in step 207, the gains of the amplifiers 30 and 34 are controllably decreased, as necessary, to respective gains associated with an 'intermediate' loop loss value (e.g., at least 20 dB, but not greater than 40 dB). Next, in query step 208, the outputs of threshold detectors 50 and 60 are again examined.

Where neither detector threshold is exceeded (i.e., the answer to query step 208 is NO), the power level monitored by power meter 70 is read in step 209. The measured power level is then compared with the set of values stored in the look-up table for the loop cable plant, as described above, in order to generate an estimate of signal loss in the loop. For the intermediate gain setting, a 20–40 dB loss conversion table may be employed. In step 206, the measured loop loss value determined in step 209 is then used to selectively illuminate some number of LEDs of the display 72 to provide a front panel indication of the measured power level, as described above.

If the answer to query step 208 is YES (i.e. at least one of the two detector thresholds is exceeded), then it is inferred that the loop loss is less than that associated with the intermediate amplifier gain range (less than 20 dB in the present example), and the gains of amplifiers 30 and 34 are further adjusted (decreased), as necessary, in step 210 to a minimum gain setting (associated with minimum loop loss of power of the transmitted signal). Next, in step 211, the power level measured by power meter 70 is read and compared with the set of values stored in the loop cable plant look-up table, in order to derive an estimate of 'minimum range' loop loss. For the minimum gain setting, a 0–20 dB loss conversion table may be employed. The measured loop loss value determined in step 211 is then used to illuminate LEDs of the display 72 in step 206, and provide a front panel indication of the measured power level.

As will be appreciated from the foregoing description, the loop loss measurement and reporting mechanism of the present invention obviates the need to interactively conduct a test message exchange session with a test unit installed at a far end of the loop. By relying upon a priori knowledge of the signal power and spectral content of a data port terminating the far end of the loop, the gains of receive path amplifiers may be iteratively adjusted during a data services unit quiescent period in the course of conducting refined power measurements, results of which are readily indicated on a front panel display, such as a light emitting diode (LED) array. This self-contained scheme makes it unnecessary for an outside plant technician to communicate with another individual at a test center or central office, making the technician more efficient. Reducing the need for special equipment also reduces the expense of troubleshooting the loop.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a first telecommunication transceiver unit having telecommunication signal transmit and receive communication capability at a first site and being coupled to a telecommunication signal transmission path linking a second telecommunication transceiver unit having transmit and receive telecommunication capability at a second site, remote with respect to said first site, said telecommunication signal transmission path being operative to transport telecommunication signals between said first and second telecommunication transceiver units, a method for measuring and reporting an operational parameter of said telecommunication signal transmission path at said first site, said method comprising the steps of:

(a) without a communication between said first and second sites containing information representative that a test of said telecommunication signal transmission path is to be conducted, disabling said telecommunication signal transmit communication capability of said first telecommunication transceiver unit, so as to place said first telecommunication transceiver unit in telecommunication signal receive only mode, and receiving at said first telecommunication transceiver unit a signal, lying in a band of frequencies employed for normal telecommunication signal transmission, that has been transmitted over said telecommunication signal transmission path from said second telecommunication transceiver unit at said second site at a given power level and spectral content;

(b) measuring power of the signal received in step (a);

(c) generating an estimate of loop loss of said telecommunication signal transmission path in accordance with the power measured in step (b) and a priori knowledge of signal transmission parameters of said second telecommunication signal transceiver unit at said second site; and (d) generating an indication of said loop loss by way of a display device of said telecommunication transceiver unit.

2. A method according to claim 1, wherein step (a) includes receiving said signal by means of at least one amplifier having a presettable gain, and detecting whether the output of said at least one amplifier exceeds an associated threshold, and wherein step (b) comprises measuring the power of an amplified signal as amplified by said at least one amplifier in step (a), in accordance with whether the output of said at least one amplifier exceeds an associated threshold.

3. A method according to claim 2, wherein step (a) comprises adjusting the gain of said at least one amplifier in response to the output of said at least one amplifier exceeding said associated threshold, and wherein step (b) comprises measuring the power of an amplified signal as amplified by said at least one amplifier whose gain has been adjusted in step (a).

4. A method according to claim 2, wherein said at least one amplifier comprises a first amplifier coupled to amplify a received analog signal, and a second amplifier coupled to amplify a digitized version of the analog signal amplified by said first amplifier.

5. A method according to claim 1, wherein step (c) comprises generating an estimate of loop loss of said telecommunication signal transmission path in accordance with stored cable plant parameters for said telecommunication signal transmission path to derive an estimate of signal loss through said telecommunication signal transmission path at the Nyquist frequency of said signal.

6. A method according to claim 1, wherein said display device comprises a linear arrangement of selectively illuminated light emitting elements installed at a panel of said transceiver unit.

7. A method according to claim 1, wherein step (a) comprises receiving said signal by way of at least one amplifier the gain of which is iteratively adjusted, as necessary, until the amplified signal satisfies a prescribed threshold relationship, and step (b) comprises measuring the power of the amplified signal from said at least one amplifier.

8. For use with a digital data services transceiver unit having telecommunication signal transmit and receive communication capability at a first site terminating a metallic telecommunication signal transmission path thereto from a communication device at a second site remote with respect to said first site, a method for measuring and reporting loop loss of said metallic telecommunication signal transmission path said method comprising the steps of:

(a) without a communication between said first and second sites that a test of said metallic telecommunication signal transmission path is to be conducted, disabling telecommunication signal transmit capability of said digital data services unit, so as to place said digital data services transceiver unit in a telecommunication signal receive only mode, and receiving through at least one controlled gain amplifier stage, an in-band signal, lying in a band of frequencies employed for normal telecommunication signal transmissions, as transmitted from said communication device at said second site at a given power level and spectral content;

(b) measuring the power of said signal as received and amplified by said at least one controlled gain amplifier stage; and (c) generating, by way of a display device of said digital data services transceiver unit, an indication of loop loss of said metallic signal transmission path in accordance with power measured in step (b) and a prior knowledge of signal transmission parameters of said communication device at said second site.

9. A method according to claim 8, wherein step (a) includes detecting whether the output of said at least one amplifier exceeds an associated threshold, and wherein step (b) comprises measuring the power of an amplified signal as amplified by said at least one amplifier in step (a), in accordance with whether the output of said at least one amplifier exceeds an associated threshold.

10. A method according to claim 9, wherein step (a) comprises adjusting the gain of said at least one amplifier in response to the output of said at least one amplifier exceeding said associated threshold, and wherein step (b) comprises measuring the power of an amplified signal as amplified by said at least one amplifier whose gain has been adjusted.

11. A method according to claim 8, wherein step (a) comprises iteratively adjusting the gain of said at least one amplifier, as necessary, until the amplified signal satisfies a prescribed threshold relationship, and step (b) comprises measuring the power of the amplified signal from said at least one amplifier.

12. A method according to claim 8, wherein said at least one amplifier comprises a first amplifier coupled to amplify said in-band signal, and a second amplifier coupled to amplify a digitized version of said in-band signal amplified by said first amplifier.

13. A method according to claim 8, wherein step (c) comprises generating an estimate of loop loss of said metallic telecommunication signal transmission path in accordance with stored cable plant parameters for said metallic telecommunication signal transmission path to derive an estimate of signal loss through said metallic telecommunication signal transmission path at the Nyquist frequency of said in-band signal.

14. A method according to claim 8, wherein said display device comprises a linear arrangement of selectively illuminated light emitting devices installed at a panel of said transceiver unit.

15. An arrangement for measuring and reporting loop loss of a metallic telecommunication signal path to which a digital data services transceiver having telecommunication signal transmit and receive capability is coupled at a first site, said metallic telecommunication signal communication path being coupled to a communication device at a second site remote with respect to said first site, said arrangement comprising:

at least one controlled gain amplifier stage, which is operative, without a communication between said first and second sites containing information representative of conducting a test of said metallic telecommunication signal path, and with transmit capability of said digital data services transceiver being disabled, so as to place said digital data services unit in receive only mode to receive an in-band signal transmitted at a given power level and spectral content from said communication device at a second site during said receive only mode of said digital data services unit, said in-band signal lying in a band of frequencies employed for normal telecommunication signal transmissions;

signal power measurement circuitry coupled to an output of said at least one controlled gain amplifier stage, and being operative to measure the power of said in-band signal as received and amplified by said at least one controlled gain amplifier stage; and an output unit, including a display device for said digital data services transceiver unit, and being operative to generate an indication of loop loss of said metallic telecommunication signal path in accordance with in-band signal power measured by said signal power measurement circuitry, and a prior knowledge of signal transmission parameters of said communication device at said second site.

16. An arrangement according to claim 15, wherein said signal power measurement circuitry includes threshold detector circuitry that is operative to detect whether the output of said at least one amplifier exceeds an associated threshold, and is controllably operative to measure power of an amplified signal as amplified by said at least one amplifier in accordance with whether the output of said at least one amplifier exceeds said associated threshold.

17. An arrangement according to claim 16, wherein said signal power measurement circuitry is operative to adjust the gain of said at least one amplifier in response to the output of said at least one amplifier exceeding said associated threshold, and to measure the power of an amplified signal as amplified by said at least one amplifier whose gain has been adjusted.

18. An arrangement according to claim 15, wherein said signal power measurement circuitry is operative to iteratively adjusting the gain of said at least one amplifier, as necessary, until the amplified signal satisfies a prescribed threshold relationship, and to measure the power of the amplified signal from said at least one amplifier.

19. An arrangement according to claim 15, wherein said output unit is operative to generate an estimate of loop loss of said metallic telecommunication signal path in accordance with cable plant parameters for said metallic telecommunication signal path stored in a look-up table to derive an estimate of signal loss through said metallic telecommunication signal path at the Nyquist frequency of said in-band signal.

20. An arrangement according to claim 15, wherein said display device comprises a linear arrangement of selectively illuminated light emitting devices installed at a panel of said transceiver unit.

* * * * *